United States Patent [19]

Ressel et al.

[11] Patent Number: 4,642,224
[45] Date of Patent: Feb. 10, 1987

[54] PROCESS FOR REDUCING IRON AND VANADIUM IN PHOSPHORIC ACID SOLUTION

[75] Inventors: Herbert Ressel, Erftstadt; Hans Haas, Swisttal; Johannes Krause, Hürth, all of Fed. Rep. of Germany

[73] Assignee: Hoechst Aktiengesellschaft, Fed. Rep. of Germany

[21] Appl. No.: 782,701

[22] Filed: Oct. 1, 1985

[30] Foreign Application Priority Data

Oct. 15, 1984 [DE] Fed. Rep. of Germany ....... 3437684

[51] Int. Cl.[4] .............................................. C01B 25/16
[52] U.S. Cl. .................................. 423/321 R; 422/209; 422/210; 422/225
[58] Field of Search .................................... 423/321 R

[56] References Cited

U.S. PATENT DOCUMENTS

| | | | |
|---|---|---|---|
| 3,421,845 | 1/1969 | Peterson | 423/184 |
| 4,053,562 | 10/1977 | Harnisch et al. | 423/321 R |
| 4,146,575 | 3/1979 | Gallistru et al. | 423/321 R |
| 4,147,757 | 4/1979 | Richards et al. | 423/313 |
| 4,374,805 | 2/1983 | Worthington et al. | 423/321 R |
| 4,394,360 | 7/1983 | Schrodter et al. | 423/321 R |
| 4,485,078 | 11/1984 | Weston et al. | 423/321 R |
| 4,490,336 | 12/1984 | Worthington et al. | 423/321 S |

Primary Examiner—John Doll
Assistant Examiner—Wayne A. Langel
Attorney, Agent, or Firm—Connolly & Hutz

[57] ABSTRACT

Iron and vanadium is phosphoric acid solution are reduced. To this end, the phosphoric acid solution is contacted with ferrophosphorus which is used as the reductant.

6 Claims, 1 Drawing Figure

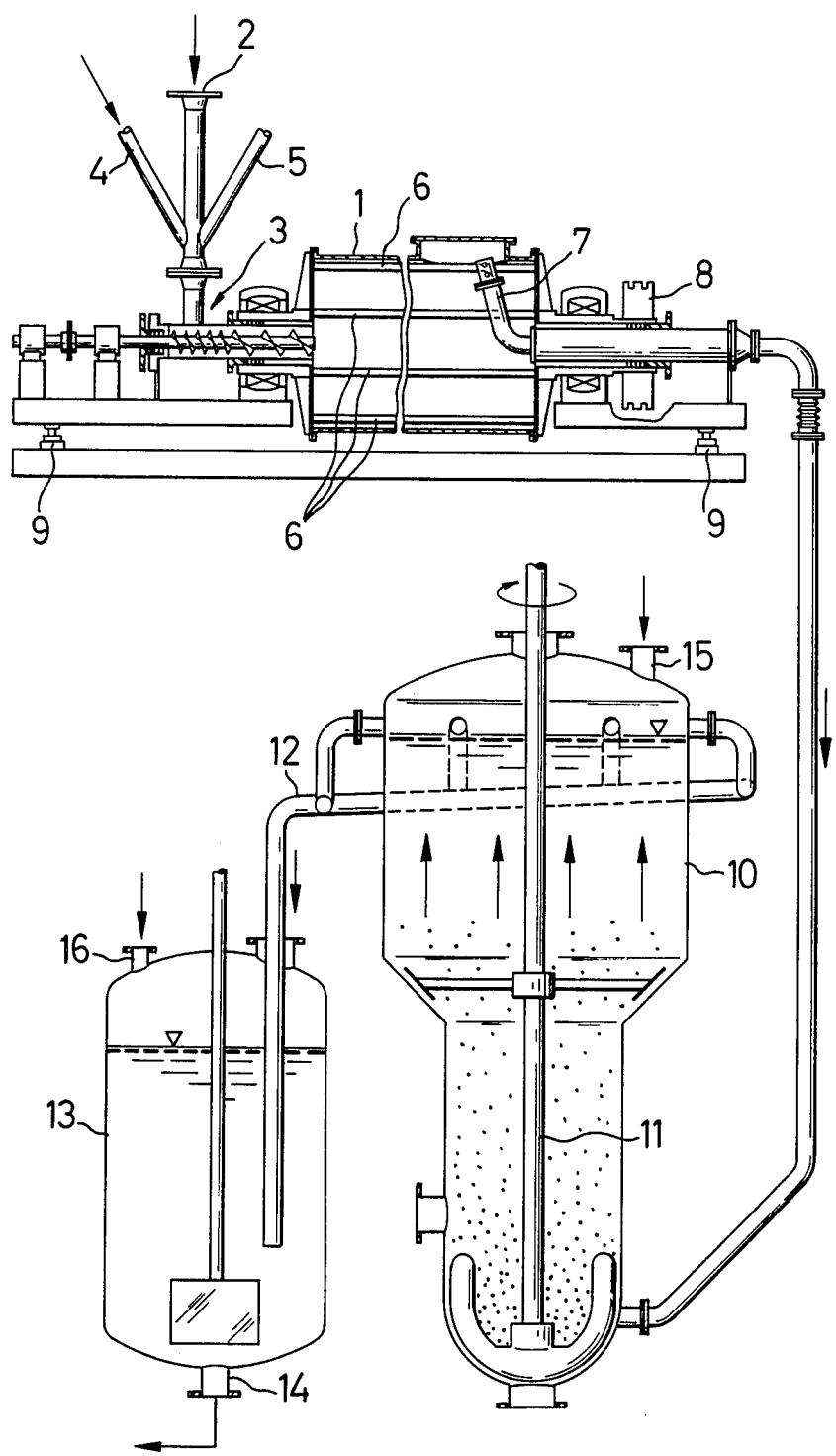

PROCESS FOR REDUCING IRON AND VANADIUM IN PHOSPHORIC ACID SOLUTION

The present invention relates to a process for reducing iron and vanadium in phosphoric acid solution, especially in wet process phosphoric acid, with the aid of a reductant.

It has long been known that iron and vanadium in phosphoric acid solution can be reduced. The reductants commonly used heretofore are selected, e.g. from iron powder, aluminum powder or zinc powder, iron-(II)salts, sulfuric acid, sulfides, sulfites, dithionites or hydroxymethanesulfinates (cf. German Specifications Nos. DE-A-1 065 388, DE-A-1 567 619, DE-A-2 528 895 and U.S. Pat. No. 3,421,845).

These reductants are not fully satisfactory as they introduce considerable proportions of foreign cations and anions into the phosphoric acid solution, and under circumstances undergo reaction with evolution of annoying gas, e.g. hydrogen, $H_2S$ or $SO_2$. In addition, the processes used heretofore cannot be effected continuously.

It is therefore highly desirable to have a process permitting these adverse effects to be avoided.

The present invention now unexpectedly provides such process wherein the phosphoric acid solution containing iron and vanadium is reacted with a granular ferrophosphorus reductant which is preferably used in form of particles with a size of 1 to 10 mm.

Ferrophosphorus crushed to particles with a size of 1 to 10 mm should preferably be used. Minor proportions of fines, i.e. up to 10%, which are invariably obtained during crushing do not interfere and need not be sieved off.

A particular advantage of the present process resides in the fact that it can be carried out continuously. To this end, the phosphoric acid is continuously introduced into a reactor partially filled, i.e. to about 50% its volume, with granular ferrophosphorus and rotating around its transverse axis, and after reaction it is continuously taken therefrom. As the individual ferrophosphorus particles are subject to friction in the rotating reactor, a certain quantity of ferrophosphorus fines is invariably obtained during the reaction, which issues from the reactor jointly with the effluent solution. It is therefore good practice to introduce the solution coming from the reactor into a container and to allow the ferrophosphorus fines to undergo post-reaction therein and to deposit. The quantity of ferrophosphorus consumed during the reaction should naturally be replaced with fresh ferrophosphorus.

The reaction should preferably be effected at temperatures higher than 70° C., more preferably at temperatures between 80° and 95° C.

The artisan would not have expected ferrophosphorus to react in a phosphoric acid solution containing iron and vanadium in the manner described as ferrophosphorus is known to be little reactive in pure thermal phosphoric acid.

In addition, it would not have been foreseen that ferrophosphorus reacts with phosphoric acid practically in the absence of any significant evolution of hydrogen or hydrogen phosphide.

Tests made on wet process phosphoric acid have shown that the reaction subsides relatively soon in the event of the reduction being carried out in a fixed bed reactor, e.g. in a column packed with ferrophosphorus. The reason for this is that wet process phosphoric acid, depending on the origin of the phosphate ores from which it is made, is more or less contaminated with titanium effecting encrustations on the surface of the ferrophosphorus particles, the encrustations containing difficultly soluble potassium/sodium/titanium-phosphate. By the use of granular ferrophosphorus and by effecting the reduction in a rotating reactor in accordance with this invention, the encrustations become continuously destroyed and the surface of the ferrophosphorus particles continuously renewed. As a result, channels through which solution could flow without undergoing reaction are prevented from forming.

The phosphorus participating in form of ferrophosphorus as a reductant in the reduction practically yields 5 reduction equivalents per mol phosphorus and is itself extensively oxidized to phosphate; this is highly desirable as phosphate is not an annoying by-product. The quantity of iron which has to be used for effecting the reduction naturally diminishes consistently with the high redox equivalents.

A further advantage of the present process resides in the use, as a reductant, of ferrophosphorus invariably obtained during the electrothermal production of phosphorus; even ferrophosphorus deemed low grade material heretofore, i.e. ferrophosphorus with relatively high silicon contents, e.g. of 3 to 8 wgt % Si, can be used; this material has unexpectedly been found to be more reactive than ferrophosphorus containing little silicon. Apart from $Fe^{3+}$ and $V^{5+}$, the present process can be used for reducing heavy metal ions of higher valency, such as $U^{6+}$ or $Cr^{6+}$.

An apparatus suitable for use in carrying out the process of this invention will now be described diagrammatically with reference to the accompanying drawing. The apparatus is comprised of a drum 1 which is rotatable around its transverse axis, partially filled—i.e. up to 50% its volume—with granular ferrophosphorus, and provided with a ferrophosphorus inlet 2, and inert gas, e.g. nitrogen, inlet 5 and a reaction product outlet 7.

Advantageous features of the apparatus of this invention provide:

(a) for the drum 1 to be formed with a plurality of baffle plates 6 transporting the ferrophosphorus upwardly and dropping it back through the phosphoric acid solution, while the drum is in rotation;

(b) for the inlets 2, 4 and 5 to be connected to drum 1 by means of a packing screw 3;

(c) for the outlet 7 to be formed as a stationary overflow in upright position, terminating in the upper portion of the drum 1 and thus permitting the reaction volume to be fully utilized and the residence time of the phosphoric acid solution in the drum 1 to be prolonged;

(d) for a heat exchanger—not shown in the drawing—permitting the solution to be heated to be mounted ahead of the phosphoric acid inlet 2;

(e) for the drum 1 to be connected by means of a sprocket wheel 8 to a geared engine variable in speed permitting the optimum reaction speed, preferably 0.2 to 4.0 rpm, to be established; and (f) for the drum 1 to be mounted on a weighing device permitting the consumption of ferrophosphorus to be determined and the consumed material to be replaced.

A further preferred feature provides for the outlet 7 to be connected to a container 10 provided with an agitator 11. In container 10, fine particulate ferrophosphorus carried along with the solution coming from drum 1 is allowed to undergo post-reaction; this is a minor quantity of ferrophosphorus obtained during crushing and during the reaction in the drum. Container 10 is comprised of a lower cylinder having a closed bottom end, an intermediate structural element placed above the lower cylinder and connecting it to an upper closed cylinder having a diameter larger than the lower cylinder, the lower end of the lower cylinder being connected to the outlet 7 and the upper cylinder having an outlet 12 secured to its upper end, the outlet 12 opening into a reservoir 13 with outlet 14.

It is also advantageous to dispose an inert gas outlet 15 and 16, respectively, near the head each of container 10 and reservoir 13.

An apparatus 10 as described hereinabove makes it possible for ferrophosphorus particles carried along first to deposit in the upper portion larger in diameter and then to undergo post-reaction in the lower portion smaller in diameter, the particles being kept in agitation by the agitator 11 fitted to the wall.

Granular ferrophosphorus formed, encrusted and abraded during the reaction is taken from drum 1 together with fine particulate ferrophosphorus so that it is possible for the phosphoric acid solution to be directly processed, i.e. primarily neutralized, without subjecting it to intermediary filtration.

Even in the event of ferrophosphorus fines, if any, going forward into the neutralization zone, there is unexpectely no evolution of hydrogen phosphide not even in a strongly alkaline medium. It is not necessary therefore to take special precautions.

The following Example illustrates the invention which is naturally not limited thereto.

EXAMPLE

A drum 0.8 m wide and 3 m long, provided in its interior with 6 baffle plates, was charged with 1.6 metric tons crushed ferrophosphorus (consisting substantially of particles with a size smaller than 10 mm; fines smaller than 0.5 mm=3.8%) composed of 22.9% P, 4.7% Si, 2.4% Ti, the balance being Fe.

The drum was continuously fed at 2 rpm with 7 $m^3/h$ phosphoric acid at 80°-90° C. containing 27.9% $P_2O_5$, 123 ppm V and 0.2% Fe-total, $Fe^{2+}$ being present in a proportion of 0.02%. The phosphoric acid coming from the drum contained 0.23% Fe-total and 0.22% $Fe^{2+}$. 725 $m^3$ acid was reduced within 95 hours and collected in a reservoir. Disodium phosphate solution was made therefrom and found to contain 18.5% $P_2O_5$ and 4.5 ppm vanadium.

We claim:

1. A process for reducing iron and vanadium in phosphoric acid solution with the aid of a reductant, which comprises reacting the phosphoric acid solution containing iron and vanadium with granular ferrophosphorus as the reductant.

2. The process as claimed in claim 1, wherein ferrophosphorus crushed to particles having a size of 1 to 10 mm is used.

3. The process as claimed in claim 1, wherein the reduction is carried out continuously by continuously introducing the phosphoric acid solution into a reactor partially filled with ferrophosphorus and rotating around its transverse axis and, after reaction, taking the solution from the reactor.

4. The process as claimed in claim 3, wherein the phosphoric acid solution taken from the reactor is given into a container in which fine particulate ferrophosphorus formed during the reaction is allowed to undergo post-reaction and to deposit.

5. The process as claimed in claim 1, wherein the ferrophosphorus consumed during the reaction is replaced by fresh ferrophosphorus.

6. The process as claimed in claim 1, wherein the reaction is effected at temperatures higher than 70° C.

* * * * *